Patented Nov. 28, 1944

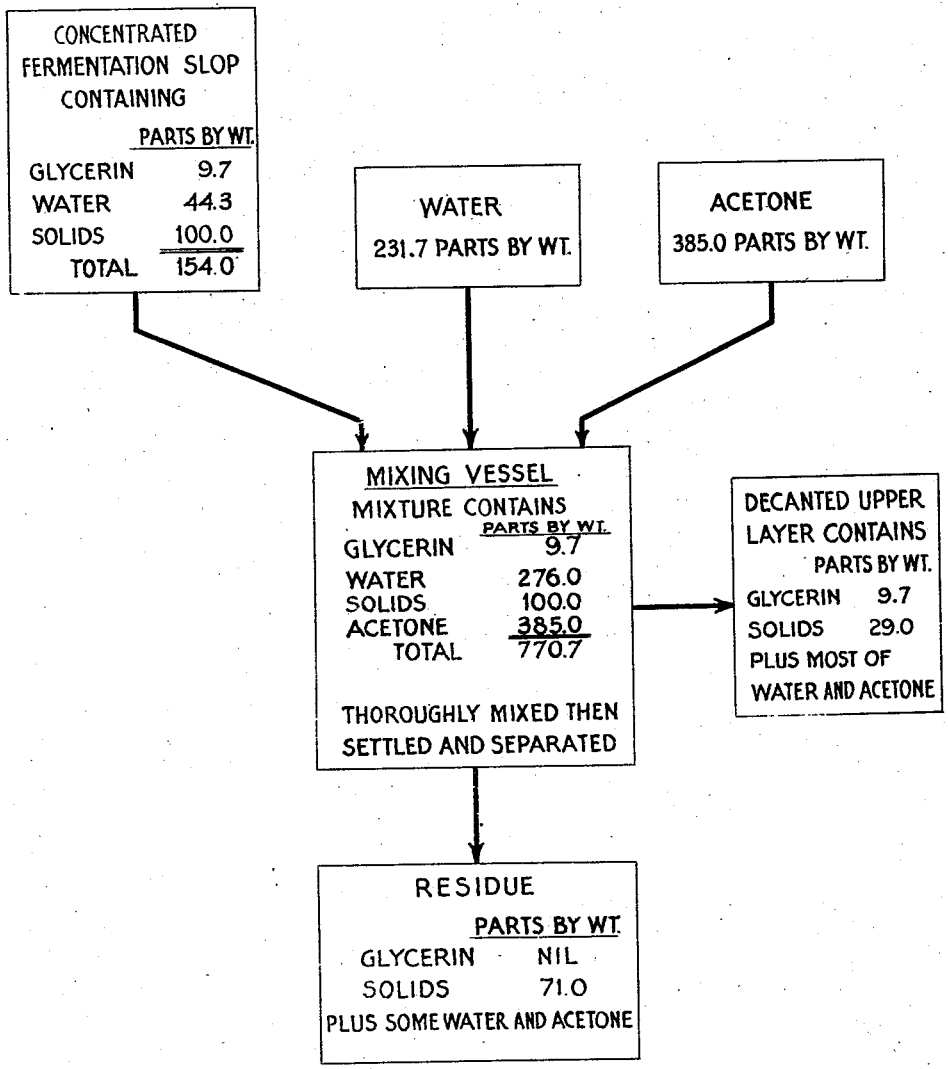

2,363,494

UNITED STATES PATENT OFFICE 2,363,494

RECOVERY OF GLYCERIN

George Washington Batchelder, Gibbstown, and Ralph Francis Peterson, Woodbury, N. J., assignors to E. I. du Pont de Nemours & Company, Wilmington, Del., a corporation of Delaware Application May 16, 1939, Serial No. 273,894

2 Claims. (Cl. 260—637)

This invention pertains to fermented sugar solutions, and more particularly to an improved method of recovering glycerin from fermented molasses solutions.

A considerable quantity of glycerin is formed in the preparation of ethyl alcohol by the fermentation of molasses. Various methods have been disclosed whereby the glycerin yield is increased, said methods in general involving maintenance of the pH value of the system undergoing fermentation on the alkaline side. In any of the methods employed for the fermentation, the ethyl alcohol is removed by distillation, leaving a beer or "slop" containing the glycerin, along with other compounds from the molasses. Numerous methods have been devised for the separation and recovery of this glycerin from the beer, but none has been altogether successful. The extreme difficulty of suitable separation is due to the inherent nature of the slop formed when the crude molasses is fermented, regardless of the particular fermentation process employed. The slop contains appreciable quantities of both organic and inorganic materials having physical and chemical properties which vary widely. That such a large number of materials having diversified properties are present is not surprising, since substantially all soluble impurities originally present in the plant from which the molasses is derived are present in the fermented slop. Likewise, the tendency of glycerin to polymerize and undergo decomposition if exposed to high temperatures for appreciable time intervals is another factor which limits the manner in which the slop may be treated.

Among the many processes evolved in an effort to separate the glycerin from the slop are included various extraction processes wherein materials which are solvents of glycerin are used in order to extract the glycerin. Due to the fact that the volume of slop is exceedingly large in comparison with the volume of glycerin, coupled with the general belief that many of the "impurities" present are less soluble when concentrated than in dilute form, these extraction processes have invariably been characterized by concentrating the beer to the greatest extent that was practicable, the decreased volume diminishing the amount of solvent required for extraction. However, most of these processes are not feasible, because the known solvents are not selective to the requisite extent, that is to say, they not only dissolve the glycerin but likewise dissolve an appreciable quantity of the impurities present. Moreover, such processes are usually characterized by the formation of a heavy, sludge-like material, which prevents effective and practicable separation of the glycerin extract therefrom.

The object of the present invention is an improved process for the recovery of glycerin from fermented molasses. Another object is a method whereby the glycerin separation is effected readily. A further object is a method which does not require filtration in order that separation of glycerin be effected. Still further objects will become apparent as the invention is described in detail hereinafter.

We have found that an effective separation of glycerin from distillery slops can be realized by defecating said slops with a solvent at least partly miscible with water, while controlling the relationship of the water and solid materials present. Surprisingly, the control in the ratio of these materials permits an efficient defecation by means of extraction agents which, in the absence of such control, are quite ineffective. Whereas well-known solvents for glycerin, when used for extraction according to the methods of the prior art, either failed completely to dissolve the glycerin present, or, conversely, dissolved not only the glycerin but also large quantities of impurities which could not be eliminated without undue difficulty, the same solvents, provided they are at least partly miscible with water, when employed in conjunction with our invention, possess high value as defecating agents. The value of a defecating agent, of course, depends on its efficiency as a means of eliminating impurities from the desired product.

In operating in accordance with our process, the defecation is effected while maintaining an amount of water at least equal to the weight of "solid" present in the fermentation slop. By the term "solid" we intend to designate the material recovered when fermentation slop is dried by heating to constant weight at 160° C., and the term is used in this sense throughout the specification. When a solvent at least partly miscible with water is added to the slop, and the foregoing ratio between water and solid exists, agitation of the mixture is characterized by substantially immediate action on the part of said solvent. Moreover, after agitation, the mixture separates into two layers, the bottom layer containing the impurities being a viscous fluid, whereas the supernatant layer contains glycerin, solvent, water, and a minimum of impurities. Since both layers are liquid, it is obvious that separation may be accomplished readily without resorting to time-consuming or expensive procedures.

In order to describe our invention more in detail, reference is made to the following examples which illustrate specific embodiments thereof.

Example I

Fermentation slop:

| | | |
|---|---|---|
| Glycerin | per cent | 6.3 |
| Solids | do | 64.8 |
| Water | do | 28.9 |
| Ratio of water to solid | | 0.45 |

The foregoing composition represents a concentrated fermentation slop typical of those resulting from the production of ethyl alcohol. It will be noted that the ratio of water to solid is 0.45. When treated with acetone, substantially no solution is effected. Instead, the concentrated slop merely assumes the appearance of an extremely heavy tar, whereas analyses reveal that the acetone has failed to dissolve any glycerin. Indeed, there not only is no glycerin present in the acetone, but, in addition, said acetone remains water-white, indicating that no substantial amount of any material whatsoever is dissolved therein.

Example II

To 500 grams of the concentrated fermentation slop composition cited immediately above, there was added 750 grams of water, thereby causing dispersion of the slop. In order to show clearly the relationship of water and solids in units of weight both before and after the addition of the 750 grams of water, the slop composition is shown as follows:

| Fermentation slop | | A (before addition) | B (after addition) |
|---|---|---|---|
| Glycerin | grams | 31.5 | 31.5 |
| Solids | do | 324.0 | 324.0 |
| Water | do | 144.5 | 894.5 |
| Ratio of water to solid | | 0.45 | 2.76 |

The addition of the water produces the relationship shown in B, the weight of water being 2.75 times that of the solids present. 1250 grams of acetone were then added and the mixture vigorously agitated for about 5 minutes. Upon cessation of the agitation, two layers of liquid formed almost immediately, the bottom layer being dark and viscous, whereas the supernatant layer was a lighter-colored fluid liquid. After about 5 minutes, the supernatant layer was decanted and most of the acetone therein was removed by distillation. Analysis revealed that the supernatant layer contained substantially all the glycerin but only 29 per cent of the solids. Moreover, the solids present possessed such characteristics that they did not interfere with the separation of the glycerin when this was distilled according to known methods.

Preferably, we employ a weight of water which is between 2 and 5 times the weight of the solid present in the slop. Such a ratio permits variations in the fermentation slop compositions without affecting the ease of handling which characterizes the operation. This ratio of water to solids, of course, may be obtained in any manner practicable. Thus, the dilute beer, remaining after separation of the alcohol therefrom, may be concentrated directly to the point where the water content bears the desired ratio to the solids. According to another method, a fermented slop which has been concentrated beyond the point where the weight of water present is equal to the solids may be treated by adding the required amount of water with the solvent being employed for the defecation.

In effecting the separation of the slop-defecation agent mixture into two layers, it has been found that, in certain cases, the completeness of separation is promoted if said mixture has been warmed to temperatures above atmospheric. Consequently, if for some reason it be deemed expedient to operate under conditions wherein separation is rather sluggish, it may be desirable to take advantage of this effect of somewhat higher temperatures.

The remarkable effect produced by regulating the amount of water with respect to the solids present is well illustrated by qualitative tests wherein the fermentation slops were treated with defecating agents, some of which are miscible with water and others only partly miscible therewith. Among the defecating agents employed were ethanol, acetone, isopropanol, methyl ethyl ketone, and normal butyl alcohol.

Example III 10 grams of a fermentation slop resulting from a "sulfite" fermentation of molasses, said slop having 13.0 parts of glycerin, 69.7 parts of solids, and 17.3 parts of water, were introduced into each of 5 separate test tubes. The ratio of water to solids of this composition is 0.25. To each of the test tubes were added 25 cc. of one of the defecating agents enumerated above, i. e. ethanol, acetone, isopropanol, methyl ethyl ketone, and normal butyl alcohol. Even after shaking vigorously, in each instance there appeared to be no intermingling of the solvent with the slop, the solvent remaining water-white, whereas the slop appeared to become more sticky and gummy.

The amount of water in these samples was then made equal to the solids present by adding 5.24 gms. of water to each of the test tubes. Again they were shaken vigorously for a brief period and then allowed to stand. In all samples, the material separated to form two layers, the top layer, containing the solvent, water, and glycerin, having an amber color; whereas the bottom layer, containing the "impurities," was a dark brown, somewhat viscous liquid.

Five additional 10-gram samples of the identical fermentation slop were introduced into separate test tubes, and to each one was added 25 cc. of one of the five solvents set forth above. Then 9.76 grams of water were added to each sample, this addition producing a water-to-solids ratio of 2.4. When agitated as above, the results were similar to those obtained when the weight of water was equal to that of the solids. However, in the present instance, the color of the supernatant layer was somewhat darker, and the bottom layer appeared slightly less viscous. In addition, the separation of the material into the two layers seemed more rapid.

Example IV

A fermentation slop resulting from an ordinary fermentation of molasses, and containing 7.66 parts of glycerin, 53.30 parts of solids, and 39.04 parts of water, was subjected to tests conducted in a manner identical with those described in Example III, the identical solvents set forth therein being employed in the instant case. The water-to-solids ratio in this composition was 0.73. When the slop having this water-to-solids relationship was treated with the solvents, there appeared to be no extraction by the solvents. In each sample, the solvent remained water-white, the slop tending to become more sticky and less mobile than it was originally.

Increasing the water-to-solids ratio to 1.68 caused interaction of the solvent and slop, with the subsequent formation of two fluid layers of material, an amber supernatant layer containing the glycerin, water, and solvent, and a bottom layer composed of a rather viscous, heavy, brown fluid having some solid material suspended therein.

Another series of tests wherein the water-to-solids ratio was increased to 2.61 showed additional improvement, in that separation of the material into two layers was somewhat faster, and the liquid of the bottom layer had less solid suspended therein.

In the foregoing examples it will be noted that acetone, ethanol, and isopropanol represent solvents miscible with water, whereas methyl ethyl ketone and normal butyl alcohol are only partly miscible therewith. In connection with the solvents only partly miscible with water, we do not intend to limit our invention to the degree of solubility of water in such solvents comprising the maximum amount of water which can be employed advantageously in treating the fermentation slop, because an amount of water in excess of that sufficient to saturate the partly miscible solvent acts as a diluent and thus facilitates the defecation operation.

It will be understood that the amount of water which may be used for the defecation process is limited because an indefinite increase in the water present eventually produces a very dilute mixture wherein the fermentation slop is completely dissolved and defecation by means of a solvent is not feasible. The permissible water content varies with variations in the composition of the fermented slop, mode of preparation of said slop etc., but may be determined readily for any particular slop by experiment.

It will be understood that defecation of the slop need not be effected by a single contact of the solvent therewith; it is desirable under certain conditions to treat the slop with two or more successive portions of solvent in order to insure complete recovery of the available glycerin. This may be found particularly desirable if a solvent of low water-miscibility, such as isobutyl alcohol, is employed, because, in such case, due to the limited solubility of isobutyl alcohol in water, the two-component isobutyl alcohol-water phase contains only part of the solvent, with the result that the available glycerin may not be extracted completely by a single contact of the solvent with the slop. Thus, advantages may be derived by recycling such solvent through the slop being treated.

Since the fermentation slops upon being treated in accordance with our invention yield two fluid layers, it is obvious that separation of said layers may be effected by decanting or siphooning off the supernatant layer rather than by drawing off the lower layer. The glycerin in the supernatant layer, after removal of most of the solvent, can be further purified by known methods of distillation.

It will be appreciated by those skilled in the art that many variations may be made from the details of our invention without departing from the spirit and scope thereof. We intend, therefore, to be bound only in accordance with the following claims.

We claim:

1. A method of recovering glycerin from fermentation slops, which comprises mixing therewith a volatile solvent for glycerin at least partly miscible with water and possessing low solubility for the solid material present, maintaining the water content of said slops and added solvent between 2 and 5 times the weight of the solids present in the slops, permitting separation into two flowable layers, and recovering glycerin from the top layer.

2. A method of recovering glycerin from fermentation slops, which comprises mixing therewith a volatile solvent for glycerin at least partly miscible with water and possessing low solubility for the solid material present, maintaining the water content of said slops and added solvent between 2 and 5 times the weight of the solids present in the slops, heating above atmospheric temperature but below the boiling point of any constituent, permitting separation of the warm material into two flowable layers, and recovering glycerin from the top layer.

GEORGE WASHINGTON BATCHELDER.
RALPH FRANCIS PETERSON.